(12) United States Patent
Silva et al.

(10) Patent No.: US 6,370,136 B1
(45) Date of Patent: Apr. 9, 2002

(54) DIALING PLAN ARRANGEMENT FOR EXPANDABLE TELECOMMUNICATIONS SYSTEM

(75) Inventors: Michael C. Silva, Centerville; Yue Zhou, Hyannis, both of MA (US)

(73) Assignee: Lucent Technologies Inc., Holmdel, NJ (US)

( * ) Notice: Subject to any disclaimer, the term of this patent is extended or adjusted under 35 U.S.C. 154(b) by 0 days.

(21) Appl. No.: 09/272,664

(22) Filed: Mar. 18, 1999

(51) Int. Cl.[7] .................. H04L 12/28; H04M 7/00
(52) U.S. Cl. .................. 370/352; 370/469; 379/201; 379/242; 379/230
(58) Field of Search .................. 370/238, 351, 370/354, 352, 375, 400, 469; 379/201, 202, 230, 231, 241, 242, 234, 914

(56) References Cited

U.S. PATENT DOCUMENTS

| | | | |
|---|---|---|---|
| 4,782,517 A | 11/1988 | Bernardis | 379/201 |
| 5,349,579 A | * 9/1994 | Madonna et al. | 370/354 |
| 5,420,916 A | * 5/1995 | Sekiguchi | 379/230 |
| 5,544,163 A | * 8/1996 | Madonna | 370/352 |
| 5,655,014 A | 8/1997 | Walsh | 379/201 |

OTHER PUBLICATIONS

Bellcore, Generic Requirements, "Call Processing," GR-505-CORE, Issue 1, Dec. 1997.

\* cited by examiner

*Primary Examiner*—Alpus H. Hsu
*Assistant Examiner*—Afsar M. Qureshi
(74) *Attorney, Agent, or Firm*—Cesari and McKenna, LLP

(57) ABSTRACT

We have included a Dialing Plan Engine (DPE) software component in the SSL in order for other components in the SSL to access DPE services. The DPE allows the SSL object to 'learn' the dialing plan rules for a given network. Input strings are submitted from a SSO instance to the DPE. The DPE analyzes the strings, performs necessary modifications and operations and returns a result comprising commands or subsequent instructions to the SSO instance. The DPE analyzes the input string to identify which call formats, code prefix, and/or Supplementary services apply to the call. Examples of call format include local call format, domestic long distance call format, and service call. The DPE also recognizes user-dialed Carrier Identification Codes which enables the calls to be implemented by the identified carrier; it recognizes user-dialed errors such as, partial digits, and missing code prefix and it responds appropriately to these errors.

18 Claims, 5 Drawing Sheets

FIG. 4

| STRING TYPE 401 | MODE 402 | MATCHING STRING LENGTH 404 | MATCHING STRING 406 | MATCHING STRING 408 | MINIMUM STRING LENGTH 410 | MAXIMUM STRING LENGTH 412 |
|---|---|---|---|---|---|---|
| D | SINGLE | 7 | 9518000 | ▓▓▓ | 7 | 7 |
| D | RANGE | 7 | 965XXXX | 989XXXX | 1 | 40 |
| | ... | | | | | |

FIG. 5

| STRING TYPE 501 | MODE 502 | MATCHING STRING LENGTH 504 | MATCHING STRING 506 | MATCHING STRING 508 | MINIMUM STRING LENGTH 510 | MAXIMUM STRING LENGTH 512 |
|---|---|---|---|---|---|---|
| D | SINGLE | 7 | 862XXXX | ▓▓▓ | 7 | 7 |
| D | SINGLE | | 862& | ▓▓▓ | 1 | 40 |
| D | SINGLE | | XNX& | ▓▓▓ | 1 | 40 |
| D | SINGLE | 7 | XXXXXXX | ▓▓▓ | 7 | 7 |
| D | SINGLE | | 1& | ▓▓▓ | 1 | 40 |
| D | SINGLE | 7 | 8623001 | ▓▓▓ | 7 | 7 |
| D | RANGE | 7 | 862XXXX | 869XXXX | 1 | 40 |
| | | | | | | |
| | ... | | | | | |

FIG. 6

| STRING TYPE | MATCHING STRING | MINIMUM STRING LENGTH | MAXIMUM STRING LENGTH | SPECIFIED SCORE | UNSPECIFIED SCORE | EXACT MATCH LENGTH |
|---|---|---|---|---|---|---|
| D | 862& | 7 | 10 | 3 | 0 | 0 |
| D | 861& | 7 | 10 | 0 | 0 | 0 |
| D | 8623& | 4 | 6 | 0 | 0 | 0 |
| D | 8623XXX | 7 | 7 | 4 | 3 | 1 |
| D | 862XXXX | 7 | 7 | 3 | 4 | 1 |
|   |   |   |   |   |   |   |
|   | ... |   |   |   |   |   |

FIG. 7

| STRING TYPE | INPUT STRING NAMES | EXAMPLES OF INPUT STRINGS | OPERATIONS/COMMANDS | EXAMPLES OF OUTPUT STRINGS OR COMMANDS |
|---|---|---|---|---|
| B | BILLING NUMBER STRING | 1234567 | B[0-x] | 1234567 |
| C | CARRIER CODE STRING | 0321 | C[0-x]99 | 032199 |
| D | DIALED NUMBER STRING | 15088634000 | 101 C[0-x] D[1-x] | 10103215088634000 |
| O | ORIGINATING NUMBER STRING | 1234567 | O[0-x] | 1234567 |
| D | DIALED NUMBER STRING | *70 | SEND INVOKE SERVICE COMMAND WITH D[1-x] | INVOKE SERVICE 70 |
|   |   |   |   |   |
|   | ... |   |   |   |

DIALING PLAN ARRANGEMENT FOR EXPANDABLE TELECOMMUNICATIONS SYSTEM

CROSS-REFERENCE TO RELATED APPLICATIONS

This invention is related to the following co-pending U.S. Patent Applications:

U.S. patent application Ser. No. 09/272,636 titled, ARCHITECTURE FOR PROVIDING FLEXIBLE, PROGRAMMABLE SUPPLEMENTARY SERVICES IN AN EXPANDABLE TELECOMMUNICATIONS SYSTEM; and U.S. patent application Ser. No. 09/093,555 titled, PROGAMMING-CALL-PROCESSING APPLICATION IN A SWITCHING SYSTEM, each of which was filed on even date herewith and assigned to the assignee of the present invention.

TECHNICAL FIELD

The invention relates generally to the field of telecommunications switching systems and more particularly to a software application in a switching node that analyzes and manipulates user-dialed digit strings in order to execute requested services from phone is users.

BACKGROUND OF THE INVENTION

An example of a switching system to which the present invention applies is described in U.S. Pat. No. 5,544,163, Expandable Telecommunications System, the contents of which are incorporated by reference herein. A telecommunication switching node described therein has line cards with multiple ports connected to subscriber's telephone lines or to other devices such as PSTN trunks. The switching node also includes a switch/matrix card and at least two system buses for switching calls received on one port to another port in the system. One of these buses is an incoming bus that passes messages from the line cards to the matrix card and the other is an outgoing bus which transmits messages from the matrix card to the line cards. In order to perform switching on calls, the switching node receives information from and transmits information to line card ports over the system buses at predetermined times known as time slots. Each time slot generally corresponds with a port on the switch. The time slots associated with each port and the software applications that manage calls on those time slots are generally termed "channels".

The telecommunications system also includes a host, i.e., a group of software applications that typically reside on a computer dedicated to those applications. The switching nodes on the system are interconnected by an intemodal switching network. A second network termed the "host network," interconnects the switching nodes and the host computer for supervisory control. The host, the switching nodes and the line cards each includes a software protocol application that processes calls at its level of the system. Specifically, a Layer 5 (L5) protocol application in the host manages calls at the host level; a Layer 4 protocol application (L4) in the switch manages calls at the switch level; and Layer 3 (L3) protocol applications in the line cards handle calls at the line card level of the system.

Traditionally, the L5 application in the host also managed the L4 functions in the switch. All requests to the L4 application were transmitted to the L5 application and the L5 application instructed the L4 application on how the process each request. Since the L5 application was involved in directing nearly all real-time call processing on the switch, the message traffic between the switch and the host was high and this sometimes delayed the transmission of messages between the host and the switch. Moreover, if the host-to-switch link failed or if the host failed, the switch was basically rendered inoperable.

This problem was largely resolved by expanding the L4 application in the switch to provide functions previously performed exclusively in the L5 application. With the expanded L4 application, a system operator can allocate the host processing functions between the host and the switching nodes. Thus, the host applications may be simplified, or in some cases totally eliminated.

A Supplementary Services Layer (SSL) for the development and execution of subscriber-based Supplementary services which was also a part of the L5 application, was included in the switching node as a separate application. Each call in the switching node is associated a subscriber profile which identifies the Supplementary services available to that call. Supplementary services include, for example, call waiting, call forwarding and conference calling. The SSL communicates with the L4 application through an L4–L5 interface. Without further modification, the switching node may thus execute subscriber-based Supplementary functions without intervention from a host application. The SSL may also communicate with the L5 application in the host in order for the L5 application to integrate subscriber-based services with the SSL.

The SSL comprises a Database Interface service, a Service Object Manager (SOM) and one or more instances of the Supplementary Service (SSO). The database interface service provides connection to an external database which stores each subscriber's profile. The SOM exercises overall control over each SSO instance. Each SSO instance implements the Supplementary services available to a call. A critical aspect of SSL's capability is its ability to analyze, validate, and process user-dialed digit strings that are used to activate and/or de-activate Supplementary services. Most telephone users are familiar with user-dialed commands or service codes such as 911 for emergency call and *70 for disabling call waiting. However, the above described components in the SSL do not analyze user-dialed digit strings.

In order to execute a user's requests, the SSL transmits the user-dialed strings to a dialing plan engine (DPE) module in the L5 application. The DPE analyzes the user-dialed digit strings to detect the presence of service codes and/or other commands. It validates the strings and call format, and identifies the code prefix and/or Supplementary services that apply to the call. Some examples of call format include local call format, domestic long distance call format, and service call format. The DPE also recognizes user-dialed carrier-identification codes which allow the calls to be executed by identified long distance carriers; it recognizes user-dialed errors such as, partial digit strings, or missing code prefixes and it responds appropriately to these errors. Upon analyzing a string, the DPE performs appropriate modifications and operations on the string and returns a result comprising commands or subsequent instructions to the requesting SSO instance. Moreover, the DPE implements the underlying communications network's dialing plan. The network dialing plan is a set of rules indicating how to format digit stirngs for transmission on the network. Since the SSL still relies on the L5 application to analyze user-dialed digit strings, a host failure prevents the switching node from properly processing calls with Supplementary services.

SUMMARY OF THE INVENTION

We have included a Dialing Plan Engine (DPE) component in the SSL in order for other SSL components to access the DPE services without the L5 application. Preferably, the DPE component comprises a novel Digit Match/Scoring Engine (DMSE) and a Command/Operation Engine (COE). The DMSE compares input strings with 'matching strings' contained in a rules table. The entries in the rules table also contain network dialing plan rules that the DPE component applies to matching input strings. The DMSE selects the entry in the rules table with the most specific match. Thereafter, the COE executes commands and operations specified in the selected entry. These commands and operations include the manipulation of the input strings to create output strings and instructions passed back to a SSO instance for requesting execution of a supplementary service. This arrangement allows other SSL objects to have faster and more reliable access to DPE services and to the network's dialing plan rules.

Specifically, the requesting SSO instance transmits four strings to the DPE. These strings respectively represent the billing number to which the call will be charged; the long distance carrier code, the dialed or called party number, and the originating line number. The DMSE matches the one or all of the input strings with the 'matching strings' in the rule table entries. Matching operations may produce multiple entries that match the dialed number. Thus, the DMSE applies a set of rules for weighing/scoring each matching entry. It selects the entry with the highest weight and applies the rules in that entry to the call. The COE also implements commands and operations in the selected entry including input string manipulation operations and supplementary service invocation commands.

The rules table may be downloaded from the host. This permits host applications to create, query and modify the rules table as needed. The DPE also supports multiple rules tables, thus allowing one switch to implement multiple separate dialing plans. Each rules table is assigned a table identifier which is passed to the DPE with the four input strings.

BRIEF DESCRIPTION OF THE DRAWINGS

The invention description below refers to the accompanying drawings, of which:

FIG. 4 is a diagram of the dialing plan rules table;

FIG. 5 is an example using the dialing plan rules table;

FIG. 6 shows examples using single mode rules against a dialed string; and

FIG. 7 is an example of the operations performed by the COE on input strings.

DETAILED DESCRIPTION OF AN ILLUSTRATIVE EMBODIMENT

Figure 1:
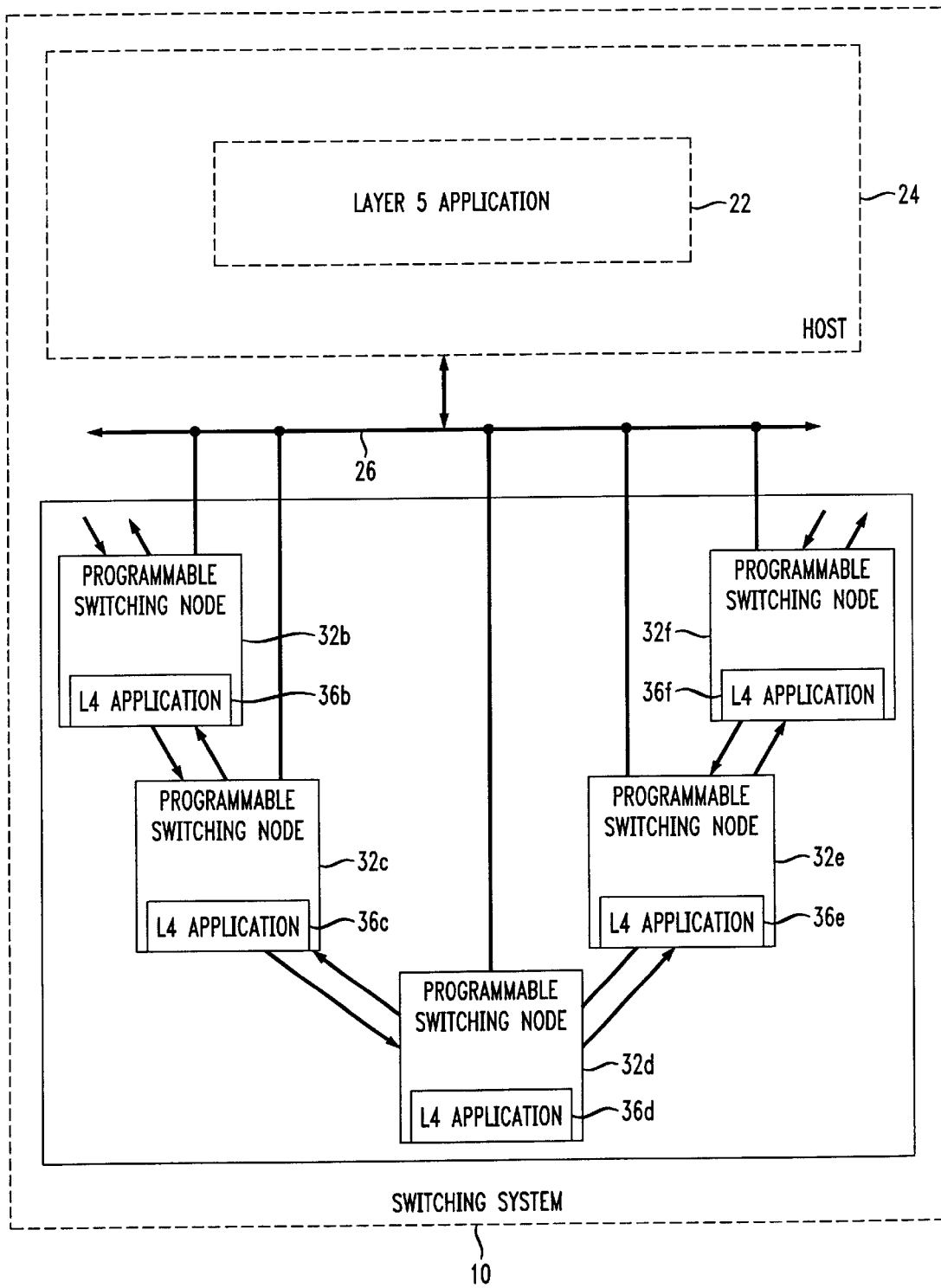
FIG. 1 is a diagram of a call switching system incorporating the invention.

The communications network in FIG. 1 is configured to process calls to, from and within a switching system 10. The switching system 10 includes switching nodes 32b–32f that are connected by a ring-like internodal switching network 34 to pass among them the various messages handled by the switching system 10. Each switching node 32b–32f is associated with a plurality of network/line interfaces (not shown) which provide connections between the switching system 10 and subscribers' lines, for example, and also with other switching systems such as the PSTN. These interfaces also provide access to system resources such as DSP resources and voice-mail functions. The communications network also includes a host computer 24 that runs a protocol application 22. The host computer 24 is linked to the switching nodes 32b–32f by a host network 26.

The host computer 24, the switching nodes 32b–32f and the line cards (not shown) include software applications which process calls in these layers. A Layer 5 (L5) protocol application 22 in the host 24 manages calls at the host level; a Layer 4 (L4) protocol application 36b–36f in each switching node 32b–32f manages calls at the switching node level; and a Layer 3 (L3) protocol application in each line cards manages calls at the line card level. The switching nodes 32b–32f also include a Supplementary services layer (SSL). The SSL enables the system operator to develop and execute subscriber-based Supplementary services in the switching node without intervention from the host application. Examples of Supplementary services include call waiting, call forwarding, and caller identification, among other.

Figure 2:
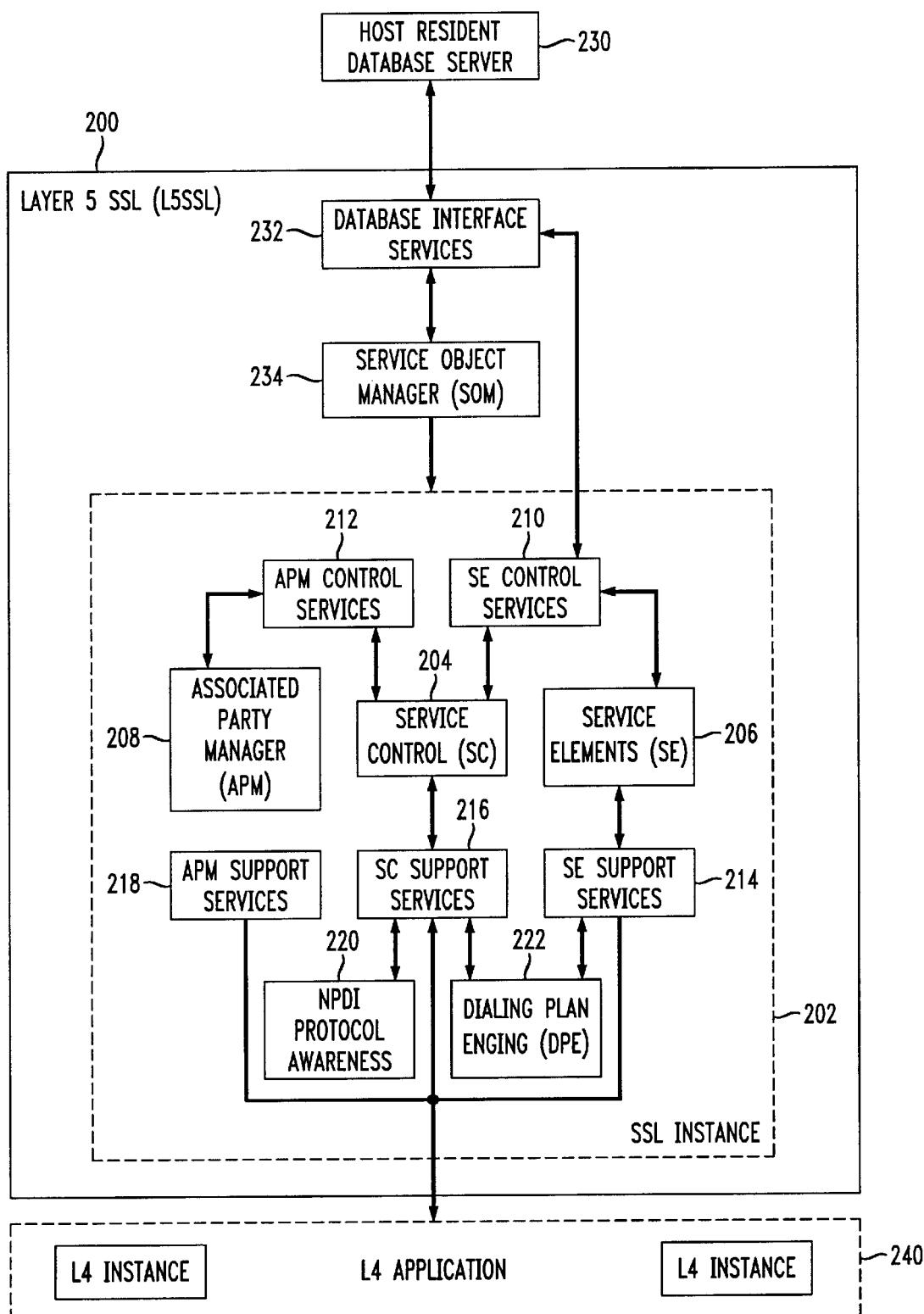
FIG. 2 is a schematic diagram of the SSL and how the objects interact with each other and with the L4 protocol application.

The illustrative SSL 200 shown in FIG. 2 communicates with the L4 application 240 through an existing L4–L5 interface. The SSL 200 comprises a Database Interface service 232, a Service Object manager (SOM) 234 and one or more instances of a Supplementary Service (SSO) 202. The database interface service 232 provides connection to an external database 230 which stores each subscriber's data. The SOM 234 coordinates the activities of each SSO instance 202 and exercises overall control over these instances. Each SSO instance 202 performs the Supplementary services for a call.

Each SSO instance 202 comprises a Service Control object (SC) 204, one or more Service Element (SE) objects 206, an Associate Party Manager object (APM) 208, Support Services objects 214–218, and Control Services objects 210–212. The SC 204 activates each of the other objects as needed. It also prioritizes the other objects; manages interaction between these objects and it is the only object that interfaces with the L4 application 240. Each instance of the SE 206 implements a single Supplementary service for each call and it accesses a suite of standard support services 214 in order to implement these Supplementary services. The APM 208 serves as an interface object to other SSO objects 202.

The SC 204, SE 206, and APM 208 each have support services 214–218. These support services 214–218 provide the functionality needed to perform each task. An example of a support service is a software object that provides access to applications such as the Dialing Plan Engine Application 222. The SE 206 and APM 208 also have control services 210–212 that implement control models for allocating, de-allocating and addressing the SE 206 and APM 208 objects.

Figure 3:
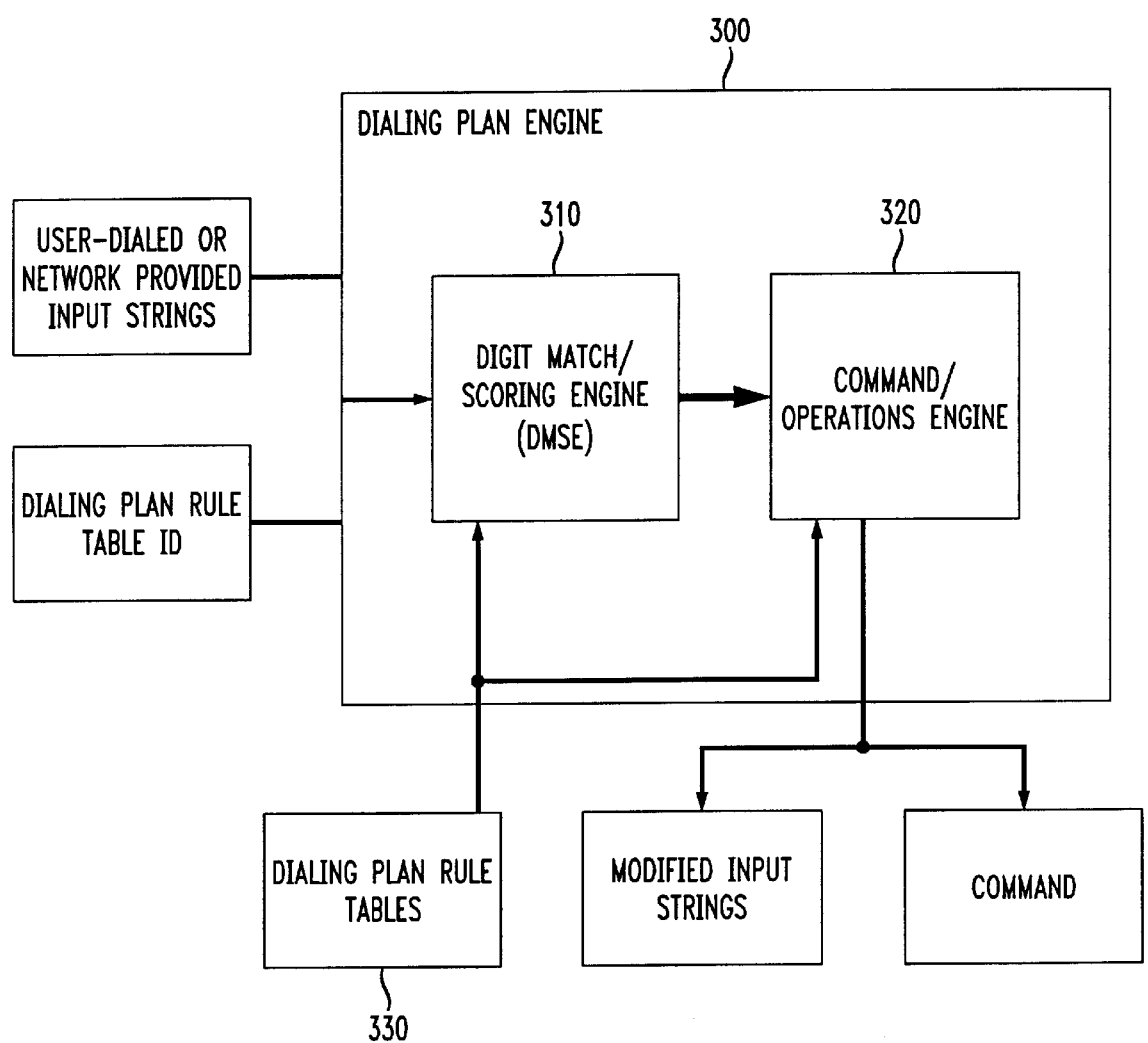
FIG. 3 is a diagram of the Dialing Plan Engine.

FIG. 3 is a diagram of the DPE 300 which comprises a Digit Match/Scoring Engine (DMSE) 310 and a Command/Operation Engine (COE) 320. The DMSE 310 matches a user-dialed or network provided digit string with entries in a dialing plan rules table 330. Entries in the rules table 330 contain information that enables the DPE 300 to determine which dialing plan rule applies to the current call. The DMSE 310 selects an entry that best matches the dialed string. The COE 320 executes the commands and operations specified in the selected entry.

Upon invoking the DPE 300, the SSO instance 202 transmits four digit strings to the DPE 300. These strings respectively represent the billing number to which the call will be charged; the long distance carrier code, the dialed or called party number, and the originating line number. The DMSE 310 may match any of the input strings with entries in the rule table 330. Matching operations may be inexact and multiple entries in the rules table 330 may match the dialed number. Therefore, the DMSE 310 applies a weight/score to each match and selects the entry with the highest weight. The rules in the highest-weighted entry is applied to the call. The COE 320 also implements the commands and operations specified in the selected entry.

Once a match is selected, the COE 320 may modify the input strings to produce output strings. The DPE returns the commands in the selected entry and the modified output string to the requesting SSO instance 202. Some examples of commands transmitted to the SSO instance 202 include a dialing plan operation complete command, a invoke a Supplementary service command, a no match command and a DPE error command. The dialing plan operation complete command indicates that the DPE 300 has successfully terminated its operation and the call may be processed by the L4 application; the invoke a Supplementary service command instructs the SSO instance 202 to invoke a Supplementary service; a no match command indicates that the string submitted did not match any of the entries in the rule table 330; and the DPE error command indicates that an error occurred.

FIG. 4 is diagram of the dialing plan rules table. The rules table 400 may be downloaded from the host. This permits host applications to create, query and modify the rules table 400 as needed. The DPE 300 supports multiple rules tables 330. Thus, one switching node may implement multiple separate dialing plans. Each rules table 400 is assigned a table identifier which is passed by the SSO instance 202 to the DPE 300 each time it is called. Each entry in the rules table 400 comprises a string type field 401, a mode field 402, a string length field 404, two matching string fields 406/408, and minimum and maximum string length fields 410 and 412.

The string type field 401 in each entry indicates which input string the DPE will compare with the matching strings 406/408. The mode field 402 indicates if an entry is a single mode entry or a range mode entry. A single mode entry includes one 'matching string'. A range mode entry includes a lower range 'matching string' and an upper range 'matching string'. The DMSE 310 applies the rules in this entry to all dialed numbers that fall between the lower and upper ranges. The string length field 404 indicates the length of fixed-length 'matching strings'. The matching string fields 406/408 identify the 'matching strings' that are compared to the input strings.

Every 'matching string' comprises the following characters: 0–9, *, #, X, N, P and &. The characters 0–9, *, and # are specified digits. In order for an input string to match a 'matching string', the input string must include each specified digit in the same position as the 'matching string'. The character X is an unspecified digit which represents any digit value. The DMSE may substitute any digit for the X character in order to match the dialed number with the 'matching string.' The characters N and P are restricted unspecified digits. The DMSE may substitute a digit from 2–9 for the N character and a digit from 0–1 for the P character. The character & allows the DMSE to compare variable length input strings to the 'matching string'. In a range mode entry, the matching string fields 406/408 include both upper and lower range 'matching strings.'

The minimum and maximum string length fields 410/412 indicate the minimum and maximum length of the input string. The minimum length is one and the maximum length is forty. Thus, a 'matching string' may have up to forty digits. If the entry is a single mode entry with a fixed length matching string, the minimum length field and the string length field must contain the same value. The maximum length field value may be greater than the string length field value so that a match may still occur if the user dials extra digits such as an extension.

FIG. 5 is an example using the dialing plan rules table. To match the 'matching string' in the first entry, the dialed number must start with 862 and it must be exactly seven digits long. For example, it may be 8623000 or 8629999, but not 8613000 or 862300. In the second entry, the dialed number must start with 862 but can be any length. For example, it can be 862, 8624000, or 8621010101. To match the third entry, the first digit in the dialed number must contain one of the following 0–9, *, or #, the second digit must have a value of 2–9, and the third digit must contain the value of 0–9, *, or #. Any seven digit string will match the fourth entry. Any string starting with one will match the fifth entry. The dialed number must be exactly 8623001 to match the sixth entry. Any seven-digits dialed number with the first three digits falling between 862 and 869 will match the seventh entry.

Multiple entries in the rules table 330 may match the dialed string, therefore, the DMSE 310 applies a weight/score to each matching entry and it selects the entry with the highest weight. The following are examples of scoring rules that the DMSE 310 applies to each entry. A match of specified digit is given the highest weight; a match of unspecified or restricted unspecified digits is given medium weight; and a fixed length match is given a lower weight. The dialed string must be within the specified minimum and maximum length for each entry; all specified digits must match and all restricted unspecified digits must meet their requirements. If two entries have the same weight, the one with the highest specified score is selected. If there is a tie, the entry with the highest unspecified score is selected. It there is still a tie, the entry with the highest exact length match score is used; and if there is still a tie, the first entry to appear in the table is selected. A single specified point is given for each exact match; a single unspecified point is given for each unspecified digit match; and a single exact length match score is issued if there is a match with a fixed length 'matching string'.

FIG. 6 shows examples using single mode rules against a dialed string of 8623219. In the first entry, the match is based on the specified digits, 862 and a specified score of 3 is applied to that entry. In the second entry, the specified digits do not match. Thus, no score is applied. In the third entry, the length requirement are not fulfilled and no score is applied. In the fourth entry, the specified digits match, the length requirement is fulfilled, and the unspecified digits match. Therefore, a score of four is applied for number of specified digits, a score of three is applied for the unspecified digits and a score of one is applied for the length. In the fifth entry, the specified digits match, the length requirement is fulfilled, and the unspecified digits match. A score of three is applied for number of specified digits, a score of four is applied for the unspecified digits and a score of one is applied for the length. Since the specified digits in the fifth entry are less than the specified digits in the fourth entry, the fourth entry is selected and its rules are applied to the dialed number.

Upon successfully matching a number to an entry in the rules table, the COE 320 executes the operations and commands in the entry. Operations are manipulations performed on the input strings in order to build output strings. Some examples of operations performed on input strings include inserting digits, deleting digits, and appending digits. FIG. 7 is a table illustrating examples of operations performed by the COE 320 on input strings. Note that 'x' represents the rest of the string. In the first row, the COE 320 passes the billing number through to the requesting SSO instance 202. In the second row, it adds 99 to the end of the carrier code string; in the third row, it appends 101 to the carrier code and deletes the first digit or 'prefix' in the dialed number. In the fourth row, the COE 320 passes the originating number to the SSO instance 202. In the fifth row, in addition to manipulating the input string, the COE 320 returns an instruction to the requesting SSO instances to invoke a *70 supplementary service.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A switching system comprising:
   A) a plurality of switching nodes each of which includes line cards with ports for connections between the system and one or more external networks, each switching node also including a programmable Layer 4 software application that performs call-processing operations defined by a system operator,
   B) Layer 3 applications in the line cards that exchanges data between the switching system and the external network;
   C) an internal network interconnecting the switching nodes for conveying switched telecommunications data between them;
   D) a host computer that includes a Layer 5 software application which exercises supervisory control over the nodes;
   E) a host network linking the host computer and the switching nodes for supervisory and informational communications;
   F) a Supplementary service layer application in each switching node for the development and execution of subscriber-based Supplementary services, the Supplementary service layer includes:
      1. a set of network rules which indicates how to process each call in the system, and
      2. a dialing plan engine component comprising a matching component for analyzing input strings in each call and applying network rules to these strings and a command component for modifying the input strings and executing commands and operations specified in the network rules;
   G) means for communicating and passing information between:
      1. the layer 4 application and the Supplementary service layer and
      2. the layer 5 application and the Supplementary service layer.

2. The switching system of claim 1 wherein input strings, associated with each call, to the dialing plan engine component comprise:
   1. a billing number identifying where the call is charged;
   2. a long distance carrier code identifying a long distance carrier;
   3. a called party number identifying the number receiving the call; and
   4. a originating line number identifying the number from where the call is made.

3. The switching system of claim 2 where the network rules are stored in a rules table, the rules table is accessed by the matching component and the command component each time a call is processed by the dialing plan engine component.

4. The switching system of claim 3 wherein the matching component
   A. compares the at least one of the input strings with entries in the rules table;
   B. applies dialing plan engine component rules to weigh each matching entry;
   C. selects the entry with the highest weight; and
   D. applies the network rule in the selected entry to the call.

5. The switching system of claim 4 wherein the command component executes the commands and operations in the selected entry.

6. The switching system of claim 5 wherein the dialing engine plan component modifies the input strings and returns the modified strings and commands in the selected rules table entry to a requesting application.

7. The switching system of claim 6 wherein the dialing plan engine component supports multiple rules tables and thereby implements multiple separate dialing plans, each rules table having a table identifier that is passed to the dialing plan engine with each call.

8. The switching system of claim 7 wherein applications in the host may create, query and modify the rules tables which are thereafter downloaded from the host to the switch.

9. The switching system of claim 8 wherein each entry in the rules table comprises:
   1. a mode field which identifies whether the entry comprises a single matching string or a range of matching strings;
   2. an input string selector which indicates the input string used by matching component obtain a match;
   3. at least one matching string that is compared to the called party number
   4. the length of matching strings
   5. a minimum string length field indicating the minimum length of a matching called party number; and
   6. a maximum string length field indicating the maximum length of a matching called party number.

10. A switching node comprising:
    A) line cards with ports, each line card including a Layer 3 application for exchanging data between the node and one or more external networks or subscribers;
    B) a programmable Layer 4 software application that performs call-processing operations defined by a system operator, the Layer 4 application comprising an interface to a Layer 5 application in a host computer, the Layer 5 application exercising supervisory control over the switching node;
    C) a supplementary service layer application for the development and execution of subscriber-based supplementary services, the supplementary service layer includes:
       1. a set of network rules which indicates how to process each call in the system, and
       2. a dialing plan engine component comprising a matching component for analyzing input strings in each call and applying network rules to these strings and a command component for modifying the input strings and executing commands and operations specified in the network rules;

D) means for communicating and passing information between:
1. the layer 4 application and the Supplementary service layer and
2. the layer 5 application and the Supplementary service layer.

11. The switching node of claim 10 wherein input strings to the dialing plan engine component comprise:
1. a billing number identifying where the call is charged;
2. a long distance carrier code identifying a long distance carrier;
3. a called party number identifying the number receiving the call; and
4. a originating line number identifying the number from where the call is made.

12. The switching node of claim 11 where the network rules are stored in a rules table, the rules table is accessed by the matching component and the command component each time a call is processed by the dialing plan engine component.

13. The switching node of claim 12 wherein the matching component
A. compares the at least one of the input strings with entries in the rules table;
B. applies dialing plan engine rules to weigh each matching entry;
C. selects the entry with the highest weight; and
D. applies the network rule in the selected entry to the call.

14. The switching node of claim 13 wherein the command component executes the commands and operations in the selected entry.

15. The switching node of claim 14 wherein the dialing engine plan component modifies the input strings and returns the modified strings and commands in the selected rules table entry to a requesting application.

16. The switching node of claim 15 wherein the dialing plan engine component supports multiple rules tables and thereby implements multiple separate dialing plans, each rules table having a table identifier that is passed to the dialing plan engine with each call.

17. The switching node of claim 16 wherein applications in the host may create, query and modify the rules tables which are thereafter downloaded from the host to the switch.

18. The switching node of claim 17 wherein each entry in the rules table comprises:
1. a mode field which identifies whether the entry comprises a single matching string or a range of matching strings;
2. an input string selector which indicates the input string used by matching component obtain a match;
3. at least one matching string that is compared to the called party number
4. the length of matching strings
5. a minimum string length field indicating the minimum length of a matching called party number; and
6. a maximum string length field indicating the maximum length of a matching called party number.

* * * * *